(No Model.) 4 Sheets—Sheet 1.
J. B. SECOR.
ELECTRIC MOTOR.
No. 478,475. Patented July 5, 1892.
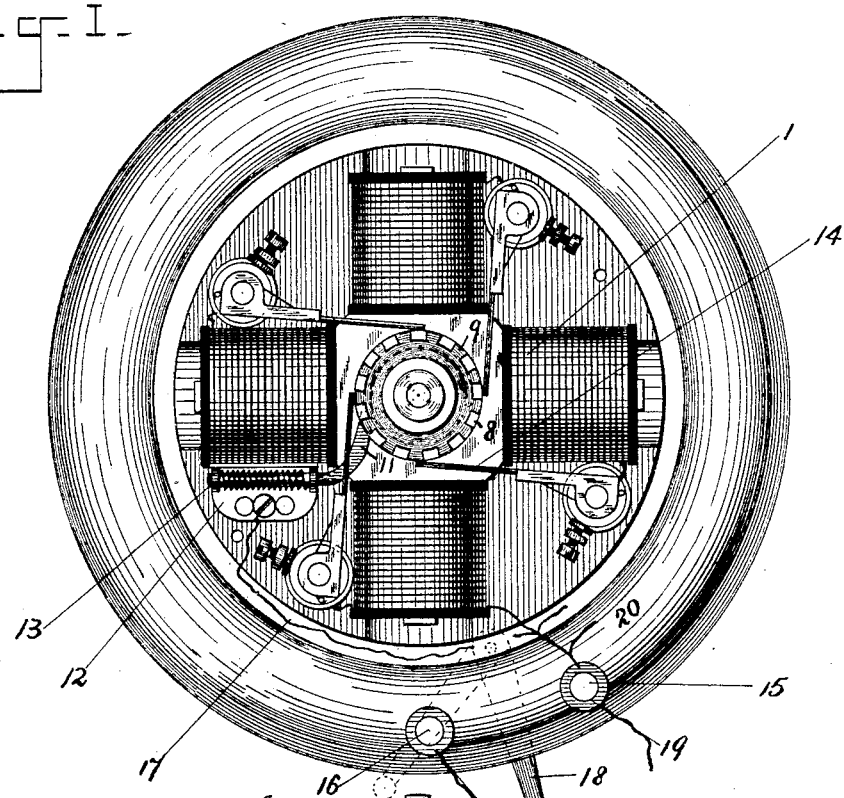
Fig. I.
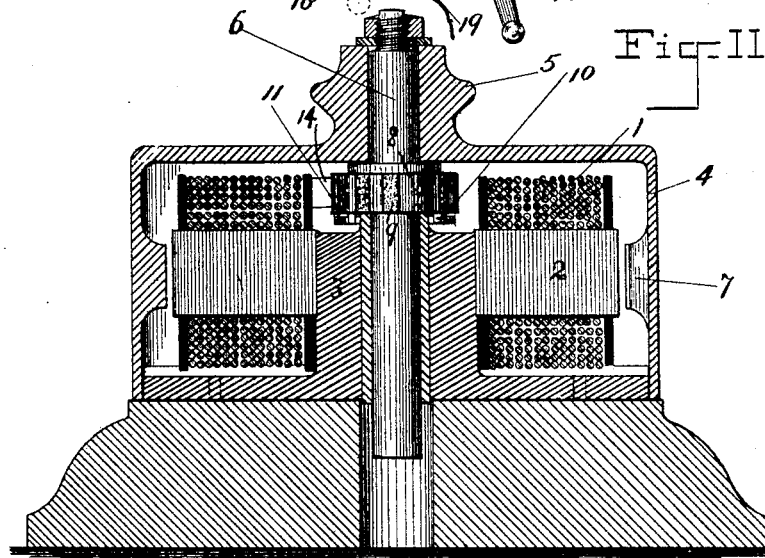
Fig. II.
Witnesses
Lillie Hanna
Frank Guile
Inventor
Jerome B. Secor
By Knight Bros.
Attys (No Model.) 4 Sheets—Sheet 2.
J. B. SECOR.
ELECTRIC MOTOR.
No. 478,475. Patented July 5, 1892.
Fig. III.
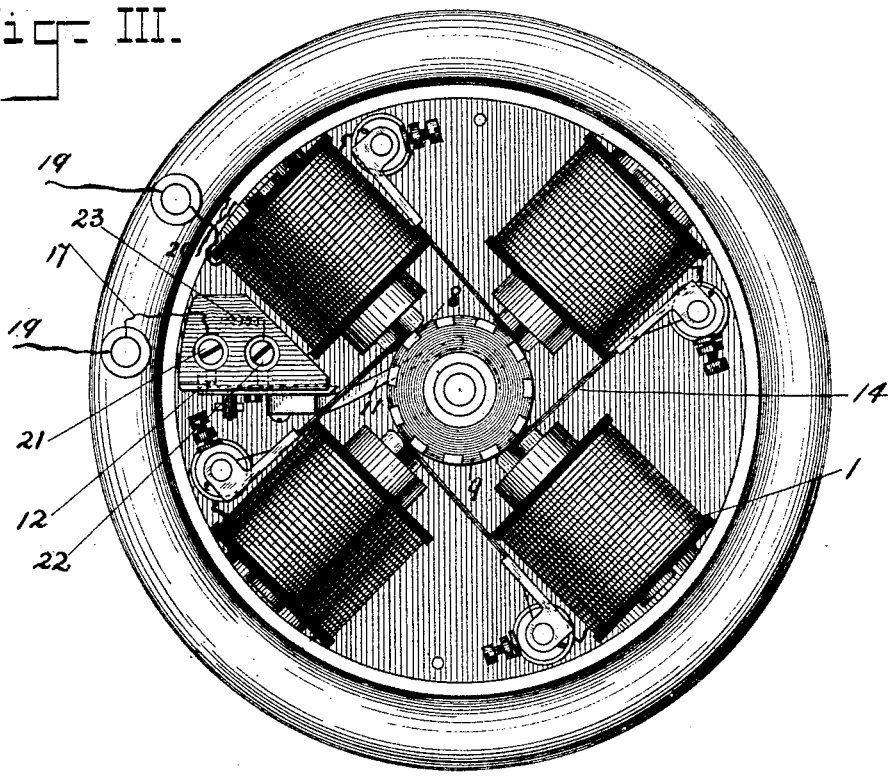
Fig. IV.
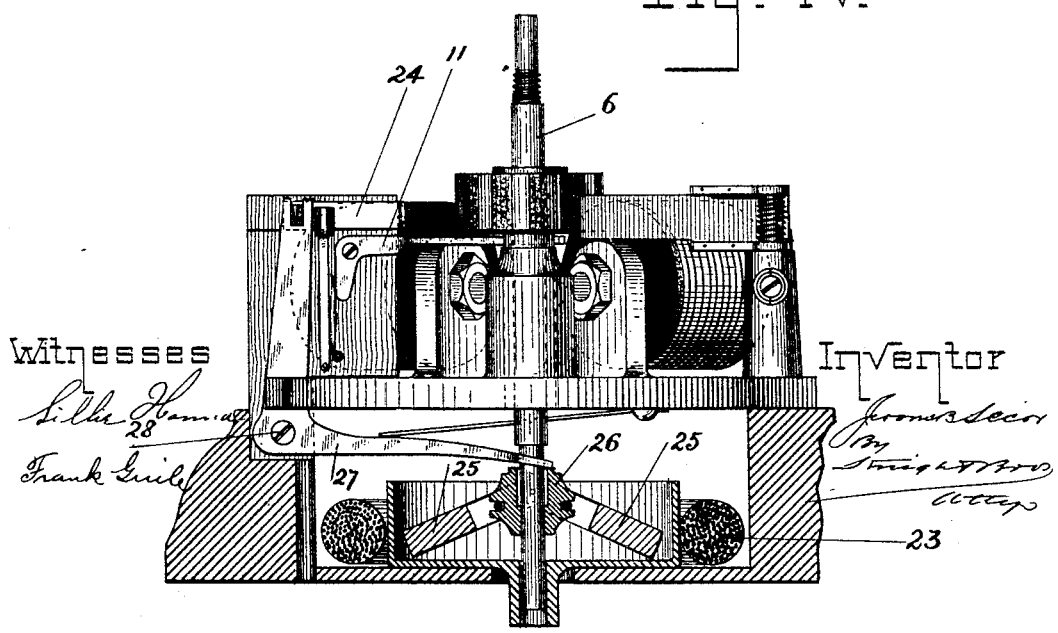
Witnesses Inventor
THE NORRIS PETERS CO., PHOTO-LITHO., WASHINGTON, D. C.

(No Model.) 4 Sheets—Sheet 3.
J. B. SECOR.
ELECTRIC MOTOR.
No. 478,475. Patented July 5, 1892.
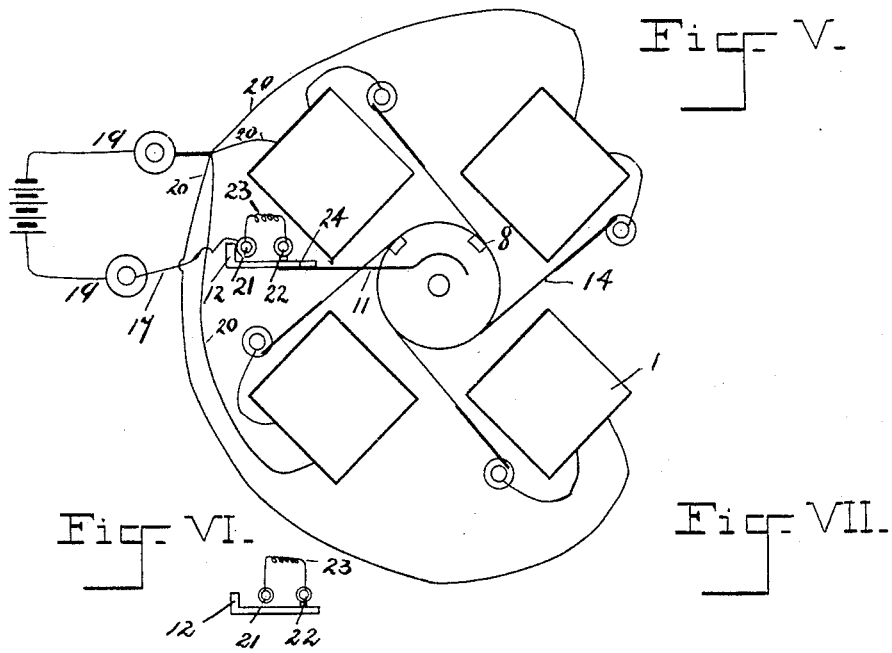
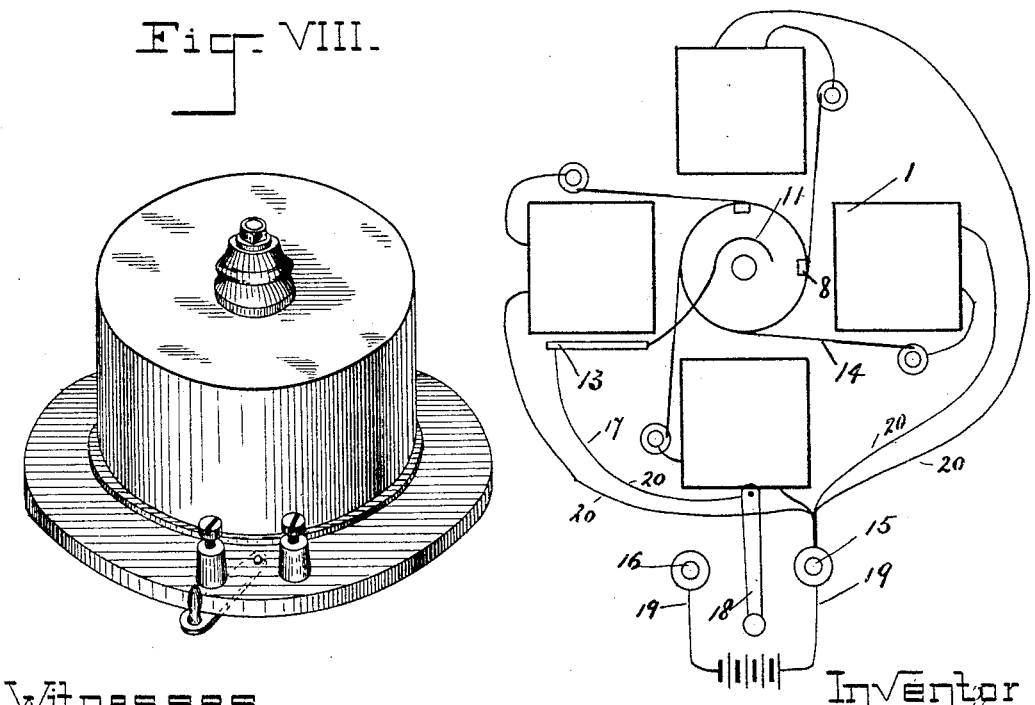
Witnesses
Inventor (No Model.) 4 Sheets—Sheet 4.
J. B. SECOR.
ELECTRIC MOTOR.
No. 478,475. Patented July 5, 1892.
Fig. IX.
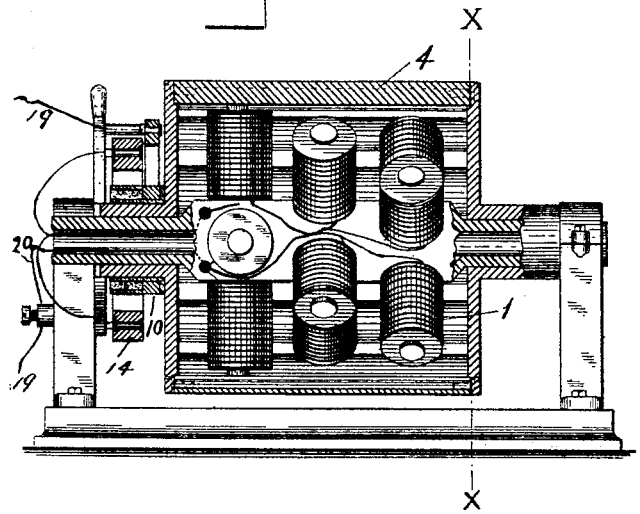
Fig. X.
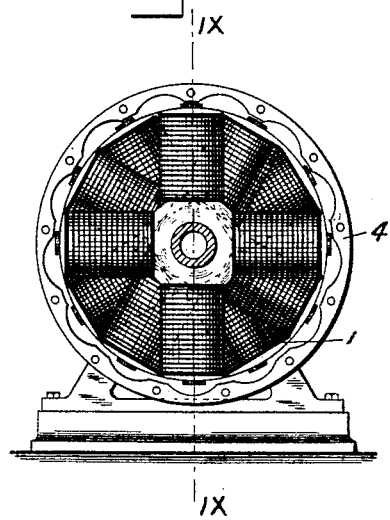
Fig. XI.
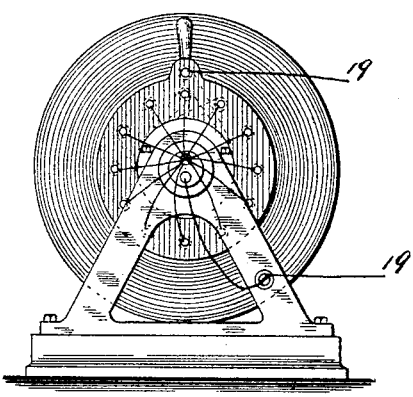
Fig. XII.
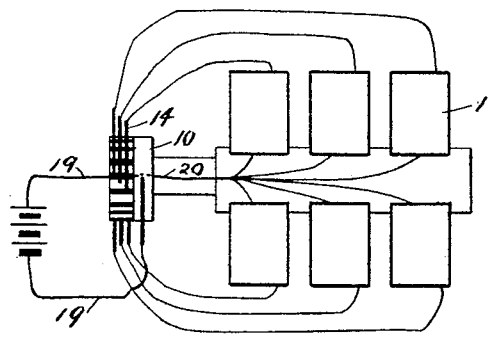
Witnesses
Lillie Hanna
Frank Gurle
Inventor
Jerome B Secor
By Knight Bros
Attys

UNITED STATES PATENT OFFICE.

JEROME B. SECOR, OF BRIDGEPORT, CONNECTICUT, ASSIGNOR OF ONE-HALF TO MARK ANTHONY, OF BERKELEY, CALIFORNIA.

ELECTRIC MOTOR.

SPECIFICATION forming part of Letters Patent No. 478,475, dated July 5, 1892.

Application filed January 30, 1891. Serial No. 379,668. (No model.)

*To all whom it may concern:*

Be it known that I, JEROME B. SECOR, a citizen of the United States, residing at Bridgeport, in the county of Fairfield, in the State of Connecticut, have invented certain new and useful Improvements in Electric Motors, of which the following is a specification.

My invention relates to a novel type of electric motor, whose salient points are a base, to which all the magnets are magnetically connected and which forms a common pole to all, a cylindrical field embracing a non-wound and non-magnetized armature of magnetic material, a method of wiring and commutation whereby current is supplied in multiple arc to the several field-bobbins in such manner that a constantly-changing half of the latter will be energized at the same time, and certain details of construction, which will first be fully described with reference to the accompanying drawings, and then more particularly pointed out in the claims.

In the drawings, Figure I is an end elevation of the motor, the armature-shell being removed. Fig. II is an axial sectional view of the motor. Figs. III and IV are similar views illustrating another form of the invention, the armature being, however, omitted in both views. Fig. V is a diagrammatic view of the circuit in this form. Fig. VI is a detail view showing the resistance shunt and switch. Fig. VII is a diagrammatic view of the circuits of the machine shown in Figs. I and II. Fig. VIII is a perspective view of the motor. Fig. IX shows in axial section on the line IX IX, Fig. X, a motor embodying certain modifications. Fig. X is a sectional elevation of this machine on the line X X, Fig. IX. Fig. XI is an end view of the same, and Fig. XII is a diagrammatic view of the circuits thereof.

The field-magnet helices 1, of any desired number, are wound on radial arms 2 of a stationary iron base-line 15, and are surrounded by the shell-like armature 4, whose hub 5 is fixed to shaft 6, having central bearing in base-line 15. I form on the inner wall of the shell 4 a series of pole projections 7, Fig. II, forming points of increased bulk, of metal, preferably greater in number than the magnet-poles 2 and of a number which is prime to the number of field-magnet poles. I have in practice used two or four field-magnets and thirteen pole projections on the armature-shell.

Referring to Figs. I and II it will be seen that the commutator is fixed upon the shaft 6 and is made up of metallic segments 8, interspaced with vulcanized fiber or other insulating material 9. All of the segments 8 are united on the under side of the commutator in the ring 10, thus forming a ring with an intermittent conducting-surface, on which bears a semi-cylindrical brush 11, which is mounted in the hanger 12 and pressed against the commutator by spring 13.

Bearing on the periphery of the commutator is a number of brushes 14, corresponding to the magnets 1. To each brush is connected one end of its corresponding magnet 1, while the other ends of all of the helices are brought to a single binding-post 15. The brush 11 is also connected to a binding-post 16 by wire 17 from hanger 12, which wire is joined to a switch-arm 18, adapted to be brought in contact with the under side of post 16. Wires 19 from the posts 15 16 lead to the opposite poles of battery or other source of electricity. It will now be seen on reference to Fig. VIII that the course of current is from the battery to post 19, thence by wires 20 through the field-magnets 1, which have brushes 14, that happen to be in contact with metallic segments of the commutator, through the commutator to brush 11, out of hanger 12 by wire 17 and switch 18 to post 16, and so to battery. In this manner there are always two of the magnets energized, attracting the poles of the armature-shell 4 which happen to be nearest to them, and as the shell revolves the armature acts to cause the current to shift around the exclusive field-magnets. Power may be taken off by a belt direct from the periphery of shell 4 or from the hub 5 thereof. By the switch 18 the operator can turn the current on or off the motor. The arrangement will, as seen by referring to Fig. VIII, form a compact, simple, neat, and dust-proof motor capable of application to a large variety of uses.

Figs. III to V illustrate a form which may be used in cases where it is desired to change the amount of current passing through the coils automatically to agree with the amount of work to be performed. In this form I provide two terminals 21 22 for the wire 17, interposing between the two, however, a resistance 23. (Indicated in Fig. IV as a roll of fine wire.)

24 is a sliding switch, which is normally in contact with projections from both the terminals 21 22, as shown in diagram in Fig. V, and is always in contact with the brush 11.

25 25 are governor-arms carried by a sliding sleeve 26 on the shaft 6 (see Fig. IV) and adapted in the usual way to rock a bell-crank lever 27 over its pivot 28 when the arms 25 rise owing to the too-great speed of rotation of the shaft. Such movement of the lever 27 slides the switch 24 out of engagement with the terminal 21, leaving the circuit intact through the resistance 23 and correspondingly bringing down the supply of current to reduce the speed of the motor. Circuits in this form of machine are fully shown in Fig. V.

It is obvious that the number of field-magnets may be increased, as desired.

On Sheet 3 of the drawings I have shown the use of several sets of field-magnets arranged along the length of the shaft, the magnets in each succeeding set being arranged slightly in advance of the other. In such an arrangement a practically-continuous pull on the armature is effected. Here the shaft is shown hollow to carry the terminal wires; but the general arrangement of the circuits is substantially the same as heretofore described.

The machine is capable of a slight modification by having the magnets revolve and the shell held stationary. The power in this instance would be taken off from the shaft.

Having thus described my invention, the following is what I claim as new therein and desire to secure by Letters Patent:

1. In an electric motor, the combination of a base of magnetic material, a series of radial field-magnets whose cores are magnetically connected with said base, a commutator and electrical connections adapted to energize said magnets successively, and a concentric non-wound and non-magnetized armature of magnetic material provided with inwardly-projecting teeth which approach the poles of the respective magnets successively and having its lower portion revolving in close proximity to the base upon which the field-magnets are mounted, all substantially as set forth.

2. In an electric motor, the combination of the circular base-plate of magnetic material, the field-magnets mounted radially upon said base-plate and having the inner ends of their respective poles magnetically connected with said plate, a commutator and electrical connections for energizing the magnets successively, and the armature surrounding said base-plate and field-magnets and consisting of the web by which it is supported, the annular flange extending downward from said web and the inwardly-projecting teeth forming a series of points of increased bulk, the edge of said armature being made to rotate in close proximity to the outer periphery of the base-plate of the field, as and for the purpose explained.

3. In an electric motor, the combination of the base-plate of magnetic material, the post projecting centrally from the magnetic base and adapted to receive the spindle, the radially-arranged field-magnets having the inner ends of their respective cores magnetically connected with the base-plate, the non-wound and non-magnetized shell-armature surrounding the base and field-magnets and consisting of the web carrying the concentric commutator and the spindle adapted to enter the central post, and the annular flange projecting from said web, with its edge rotating in close proximity to the base-plate and having the inwardly-extending enlargements intermediately of the edge and the web, all substantially as and for the purpose set forth.

4. In an electric motor, the combination of the magnetic base or support, the series of radially-extending magnets on said base or support, the non-wound and non-magnetized armature surrounding said magnets and in close proximity to the base, the commutator consisting of a solid ring having an intermittent conducting-surface, a binding-post having electrical connection with one pole of each magnet, a second binding-post having electrical connection with the ring through a brush bearing constantly thereon, and a series of independent brushes constantly bearing upon the intermittent conducting-surface of the commutator and connected with the other poles of the respective magnets, substantially for the purpose explained.

5. The combination of the shaft carrying the shell-like armature, an electric circuit comprising terminals 21 22, connected together by the resistance 23, the commutator also carried by said shaft and having the interspaced segments 8 9 and the continuous commutator-ring 10, the radial magnets, the switch 24, having engagement with said terminals, the brush 11, engaging said ring, the governor 25 26, having connection with said shaft, and the right-angled lever actuated by said governor and connected to said switch, substantially as set forth.

JEROME B. SECOR.

Witnesses:
GEO. E. SECOR,
MARCUS C. NOBLE.